United States Patent [19]

Magyar

[11] 4,023,746
[45] May 17, 1977

[54] BELT RETRACTOR WITH WINDING PREVENTION AND MEMORY MECHANISM

[75] Inventor: Joseph J. Magyar, Rochester, Mich.

[73] Assignee: General Motors Corporation, Detroit, Mich.

[22] Filed: May 19, 1976

[21] Appl. No.: 687,879

Related U.S. Application Data

[63] Continuation of Ser. No. 587,406, June 16, 1975, abandoned, which is a continuation-in-part of Ser. No. 563,100, March 28, 1975, abandoned.

[52] U.S. Cl. .................. 242/107.7; 242/107.4 A
[51] Int. Cl.² .................. A62B 35/00; B65H 75/48
[58] Field of Search ............ 242/107.4 R, 107.4 E, 242/107.6, 107.7; 297/388; 280/744–747

[56] References Cited
UNITED STATES PATENTS

| | | | |
|---|---|---|---|
| 3,682,412 | 8/1972 | Kuszynski | 242/107.6 X |
| 3,700,184 | 10/1972 | Francis | 242/107.6 X |
| 3,794,266 | 2/1974 | Schwartz | 242/107.4 R |
| 3,834,646 | 9/1974 | Heath | 242/107.7 |
| 3,858,826 | 1/1975 | Sprecher | 242/107.7 |
| 3,869,098 | 3/1975 | Sprecher | 242/107.6 X |
| 3,917,189 | 11/1975 | Bryll | 242/107.4 B |

Primary Examiner—Stanley N. Gilreath
Assistant Examiner—John M. Jillions
Attorney, Agent, or Firm—Charles E. Leahy

[57] ABSTRACT

A seat belt retractor according to the invention has a conventional inertia locking mechanism which permits the occupant to lean forwardly in the seat by unwinding belt from a reel which is biased in the winding direction by a winding spring. In accordance with the specific embodiment described, a winding prevention mechanism includes a ratchet connected to the reel and a pawl movably mounted on the housing for movement to a detenting position engaging the ratchet to block belt winding reel rotation and thereby hold the belt extended at a slackened condition about the occupant. A control disc and a blocking disc cooperate to control movement of the pawl to provide a belt retractor which prevents belt winding reel rotation to establish a slackened belt length, defines a first range of further unwinding movement during which progressive additional increments of belt slack is provided, defines a second range of further unwinding subsequent to which the belt is returned to a length within the first range, and is further effective to restore free belt winding reel rotation upon reel unwinding rotation beyond the limit of the second range.

10 Claims, 8 Drawing Figures

BELT RETRACTOR WITH WINDING PREVENTION AND MEMORY MECHANISM

This is a continuation of application Ser. No. 587,406, filed June 16, 1975, now abandoned, which was a continuation-in-part of Ser. No. 563,100, filed Mar. 28, 1975 now abandoned.

The invention relates generally to a belt retractor for a vehicle occupant restraint system and more particularly provides a winding prevention and memory mechanism which is effective in response to a predetermined sequence of reel rotation to hold the belt at a set length providing a slackened condition about the occupant and also remember this set length so that subsequent to further belt unwinding the belt will be retracted to the slackened condition.

Occupant restraint systems for motor vehicles commonly employ a shoulder belt which extends over the shoulder and across the chest of the seated occupant. One type of well-known seat belt system is a three point belt system comprising a single length of belt having its lower end mounted to the vehicle floor outboard the occupant seating position and its upper end attached to the vehicle body by an inertia responsive seat belt retactor. A latch plate assembly is slidable on the belt intermediate its ends and is engageable with a buckle mounted inboard of the occupant seating position to divide the belt into a shoulder belt portion and a lap belt portion. The seat belt retractor utilized in such a seat belt system commonly utilizes a relatively strong windup spring which rotates a reel to pull the belt through the latch plate assembly so that both the lap belt portion and the shoulder belt portion are pulled taut about the seated occupant. It is also known that three point belt systems are effective for restraint of the occupant when the lap belt portion is snug about the occupant and the shoulder belt portion is in a somewhat slackened relation with respect to the chest of the occupant.

It has been discovered that utilization of a relatively strong winding spring in the retractor results in a somewhat annoying amount of shoulder belt load across the chest of the occupant. It is therefore desirable to provide means for relieving the tension of the windup spring on the belt so as to relieve the belt tension across the chest of the occupant by introducing slack into the belt.

Automotive manufacturers have commonly solved this problem by providing a comfort clip which is slidably positioned along the shoulder belt and held in place by a sufficient clamping force so that engagement of the clip with a seat back mounted guide loop prevents the associated seat belt retractor from tensioning the belt across the chest of a vehicle occupant. In addition to relieving the tension of the belt across the chest of the occupant, such comfort clips have the advantage that if the occupant leans forward in the seat to adjust his position or facilitate the operation of various vehicle controls, the comfort clip functions as a memory device which will reestablish the slackened length of the belt across the chest of the occupant when the occupant leans rearwardly against the seat back. A feature of comfort clips of this type is that deliberate effort of the vehicle occupant is required to set the slackened length of the belt. Furthermore, the presence of the comfort clip will prevent complete retraction of the belt system to stored position unless it is deliberately moved on the belt by the occupant to a position closer to the latch plate and out of interference with the seat back mounted guide loop.

It is also known to provide a restraint belt retractor having a winding prevention mechanism which selectively relieves the tension on the belt in response to a predetermined sequence of belt movement by the restrained occupant. U.S. Pat. No. 3,869,098 by Raymond G. Sprecher, and assigned to the assignee of this invention, discloses a belt retractor of this type in which a control disc and a blocking disc are frictionally clutched to the reel for rotation therewith. The control disc has a control portion which controls movement of a spring biased pawl between a detenting position engaging ratchet teeth to prevent reel rotation in the winding direction by the winding spring and an undetenting position permitting reel rotation. The control disc and blocking disc cooperate to define a range of unwinding reel rotation during which the pawl ratchets over the engaged ratchet teeth to define a range of unwinding reel rotation during which increments of additional slackness are introduced into the belt. Upon reel winding rotation subsequent to unwinding reel rotation beyond the limit of the defined range, the blocking disc is effective to capture and hold the pawl in the undetenting position to thereby deactuate the winding prevention mechanism and restore the winding bias of the winding spring.

The present invention features a winding prevention mechanism which not only defines a first range of belt unwinding reel rotation during which belt winding reel rotation by the winding spring is blocked to thereby hold the belt in a set slackened relation about the chest of the occupant, but further defines a second range of permissible belt unwinding reel rotation during which the set slackened length of the belt is remembered so that belt winding reel rotation by the bias of the winding spring is again blocked when the belt has been rewound to its set slackened length.

A seat belt retractor according to the invention has a conventional inertia locking mechanism which permits the occupant to lean forwardly in the seat by unwinding belt from a reel which is biased in the winding direction by a winding spring. A winding prevention mechanism includes a toothed ratchet plate connected to the reel and a pawl movably mounted on the housing for movement to a detenting position engaging the ratchet teeth to block belt winding reel rotation and thereby hold the belt extended at a slackened condition about the occupant. The pawl is also movable to an undetenting position, and a further undetenting position. A control disc has a peripheral edge including a notch allowing movement of the pawl to detenting position and a cam surface spaced circumferentially from the notch for engaging and moving the pawl to the further undetenting position. The control disc is frictionally clutched to the reel for rotation therewith between one limit aligning the notch with the pawl and another limit in which the pawl is engaged by the cam surface in response to belt unwinding rotation. A blocking disc is also frictionally clutched for rotation with the reel and has a notch which receives the pawl to capture and hold the pawl in the further undetenting position in response to initiation of belt winding reel rotation subsequent to belt unwinding rotation and movement of the pawl to the further undetenting position by the cam surface. Subsequent initiation of belt unwinding rotation rotates the blocking disc to release the pawl member from the further undetenting position to the detenting position. The control disc also has a control surface which extends circumferentially between the notch and the cam surface for holding the pawl in the undetenting position during belt winding reel rotation subsequent to belt unwinding reel rotation which is insufficient to cause the cam surface to move the pawl to the further undetenting position. The control surface defines a range of unwinding movement of the belt which is permitted without moving the pawl to the further undetenting position so that the belt will be rewound on the reel until the notch is again aligned with the pawl to allow return of the pawl to the detenting position so that the belt is restored to the extended length of slackened relation of the belt about the occupant is remembered and restored.

It is an object of the invention to utilize a disc frictionally driven by the reel and coacting with a detent mechanism to define a first range of belt unwinding during which the belt is held unwound at a set length against the urging of a windup spring and a second range of belt unwinding during which the detent mechanism is temporarily deactuated until the winding spring rewinds the belt to the set length.

It is a further object of the invention to provide a belt retractor which prevents belt winding reel rotation to establish a slackened belt length, defines a first range of further unwinding movement during which progressive additional increments of belt slack is provided, defines a second range of further unwinding subsequent to which the belt is returned to a length within the first range, and is further effective to restore free belt winding reel rotation upon reel unwinding rotation beyond the limit of the second range.

A further object of the invention is to provide a seat belt system having a shoulder belt retractor which is operable in response to a predetermined sequence of reel winding and unwinding rotation to permit introduction of slack into the shoulder belt and remembers the slackened length of the belt while the seat occupant leans forwardly against the tension of the belt to operate the vehicle controls so that the belt is returned to the slackened length when the occupant leans rearwardly against the seat.

A still further feature of this invention is the provision of a belt retractor which will establish a slackened belt length and remember the slackened length during subsequent belt winding and unwinding, all in response to reel rotation induced by belt retraction and extension and without deliberate occupant effort beyond the normal effort expended in the use of a conventional seat belt system.

It is a further object of the present invention to provide an improved vehicle seat belt system for comfortably restraining an occupant in a vehicle seat and including a retractor having features of construction, combination and arrangement providing occupant comfort, high reliability, ease of operation, low cost and other features.

DETAILED DESCRIPTION OF THE PREFERRED EMBODIMENT

Figure 1:
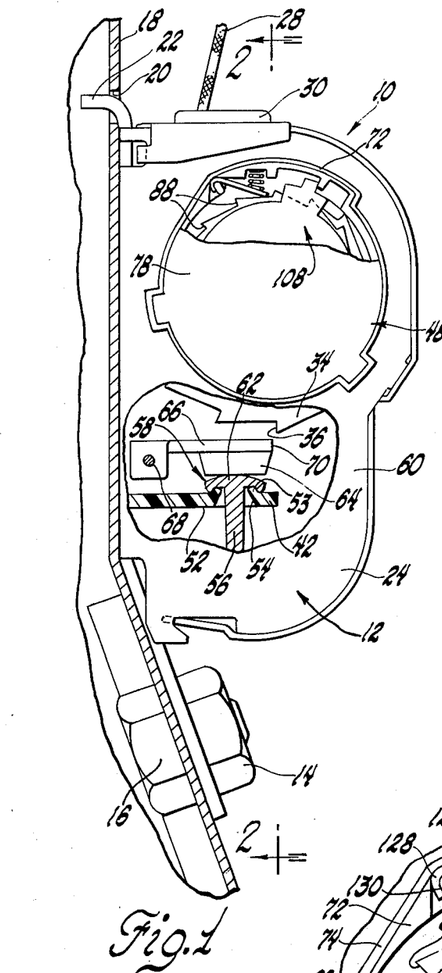
FIG. 1 is a partially broken away side elevational view of a vehicle occupant restraint belt retractor with the winding prevention mechanism maintaining the belt in an extended position against belt winding reel rotation.
Figure 2:
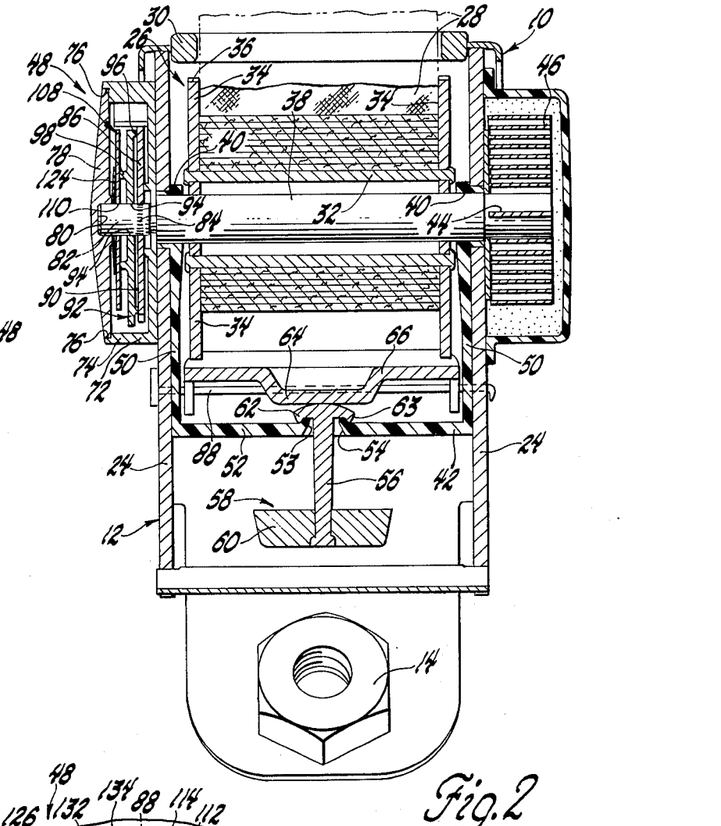
FIG. 2 is a sectional view of the retractor taken in the direction of arrows 2—2 of FIG. 1 and shows the belt reel on which the belt is wound as well as the winding prevention mechanism and a pendulum locking arrangement for locking the reel against the belt unwinding reel rotation.

Referring to FIGS. 1 and 2 of the drawings, a vehicle occupant restraint belt retractor is generally indicated by 10 and includes a metal housing generally designated by 12. The base wall of the housing of the retractor includes a weld nut 14 that permits a threaded bolt 16 to secure the lower side of the retractor to a vehicle body support member 18. The retractor 10 is particularly suited for use as a shoulder belt retractor in which case the support member 18 may be a member of the vehicle roof or a pillar of the body. The upper end of this support member 18 defines an aperture 20 that receives a positioning flange 22 of the retractor housing 12 to complete the securement and positioning of the retractor 10 in place. The retractor housing 12 also includes spaced parallel side walls 24 that are formed integral with the base wall as seen in FIG. 2. A belt reel designated generally by 26 is rotatably mounted between the side walls 24 of the retractor housing 12 and receives a belt 28 that extends upwardly through a belt guide 30 on the upper side of the retractor. The belt 28 thus extends outwardly for positioning over the shoulder and across the chest of a vehicle occupant to provide a restraining function in a manner to be described hereinafter.

The belt reel 26 of retractor 10 includes an elongated drum 32 on which the belt 28 is wound and which extends between ratchet plates 34 on the opposite sides of the belt. The ratchet plates 34 are suitably fixed to the opposite ends of the belt drum 32 and have ratchet teeth 36 that face in the belt unwinding direction of reel rotation. The belt unwinding direction is clockwise as viewed in FIG. 1. An elongated shaft 38 is received by the belt drum 32 and suitably fixed to the ratchet plates 34 such as by splining. The ends of shaft 38 are rotatably supported on the housing side walls 24 by bushing portions 40 of a pendulum support member 42. The FIG. 2 right-hand end of shaft 38 extends outwardly through the adjacent housing wall 24 and has a slot which receives the inner end 44 of a spiral or clock spring 46. The outer end of this spring, not shown, is suitably fixed to the adjacent housing side wall 24 so that the belt reel 26 is normally biased in a belt winding direction to store the belt 28 on the belt reel 26. The left-hand end of shaft 38 extends outwardly through the adjacent housing side wall 24 and is received by a winding prevention mechanism generally designated by 48.

The pendulum support member 42 includes depending legs 50 that extend downwardly from the bushing portions 40 encircling the ends of shaft 38 and the lower ends of these legs are connected by a base 52 which is oriented in a horizontal plane. An aperture 54 in the base 52 is surrounded by an upwardly extending lip 53. A pendulum 58 has a stem 56 which extends through the aperture 54 and mushrooms outwardly above the base 52 into a control portion 62. A weight 60 is supported on the lower end of stem 56. The control portion 62 has a downwardly extending peripheral lip 63 which cooperates with lip 53 of support member 42 to support the pendulum 58. The upper side of pendulum control portion 62 is engaged by a downwardly stamped control portion 64 on a locking member 66 of the retractor. The locking member 66 is pivotally supported by a pin 68 which extends between the housing side walls 24. The pendulum 58 swings from its vertically depending orientation of FIGS. 1 and 2 to an inclined position in response to abrupt vehicle acceleration or deceleration in any horizontal direction. This pendulum swinging causes the pendulum control portion 62 to pivot the locking member 66 upwardly. Locking portions 70, FIG. 1, on the locking member move upwardly as the locking member pivots and engage the ratchet teeth 36 on the belt reel 26 to terminate belt unwinding reel rotation. When the vehicle acceleration or deceleration terminates, gravity returns the pendulum 58 to its vertical position and likewise allows pivoting of the locking member 66 downwardly out of engagement with the reel ratchet teeth 36 so that belt unwinding is permitted. Since the locking member 66 is the only restraint on unwinding reel rotation, the occupant can normally unwind the belt by leaning forward in the seat or pulling on the belt.

Figure 3:
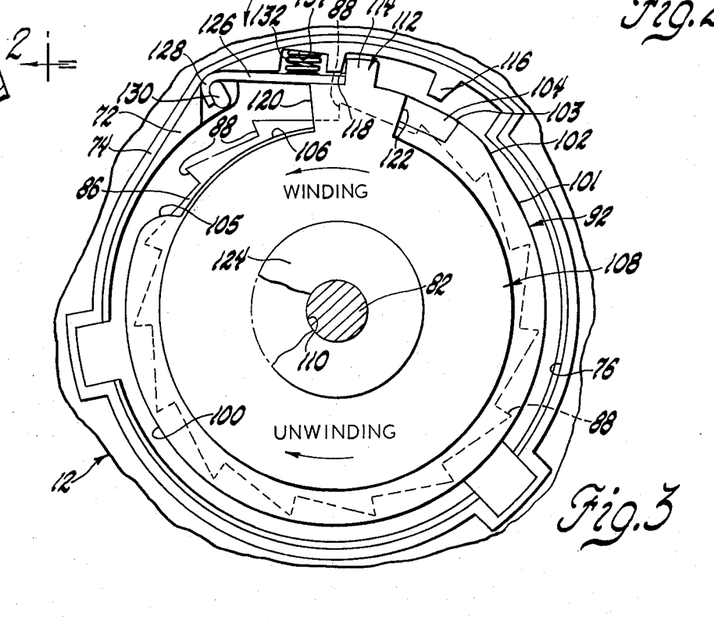
FIG. 3 is an enlarged view showing the winding prevention mechanism with the belt fully wound on the reel and the pawl in the further undetenting position.

With reference to FIG. 2, the movement of belt 28 and simultaneous rotation of the belt reel 26 controls the winding prevention mechanism 48 to selectively prevent belt winding under the bias of reel spring 46. This winding prevention mechanism 48 includes a housing 72 that is fixedly mounted on the adjacent housing side wall 24 of retractor 10. An outer wall 74 of housing 72 extends about the mechanism with a noncircular configuration as seen in FIG. 3. The outer end of housing wall 74 defines a peripheral notch 76 that receives the peripheral edge of a cover 78 shown in FIGS. 1 and 2. The central portion of cover 78 defines a circular bore 80 that rotatably supports a reduced diameter end portion 82 of reel shaft 38. This end portion 82 of the shaft has splines 84 that fix a ratchet plate 86 to the shaft for rotation with belt reel 26. As seen in FIG. 3, the ratchet plate 86 is generally circular and has ratchet teeth 88 that face in the counterclockwise belt winding direction of reel rotation, oppositely of the teeth 36 on the ratchet plates 34. The side of ratchet plate 86 that faces to the left in FIG. 2 provides a friction surface 90.

Figures 4, 5, 6, 7, 8:
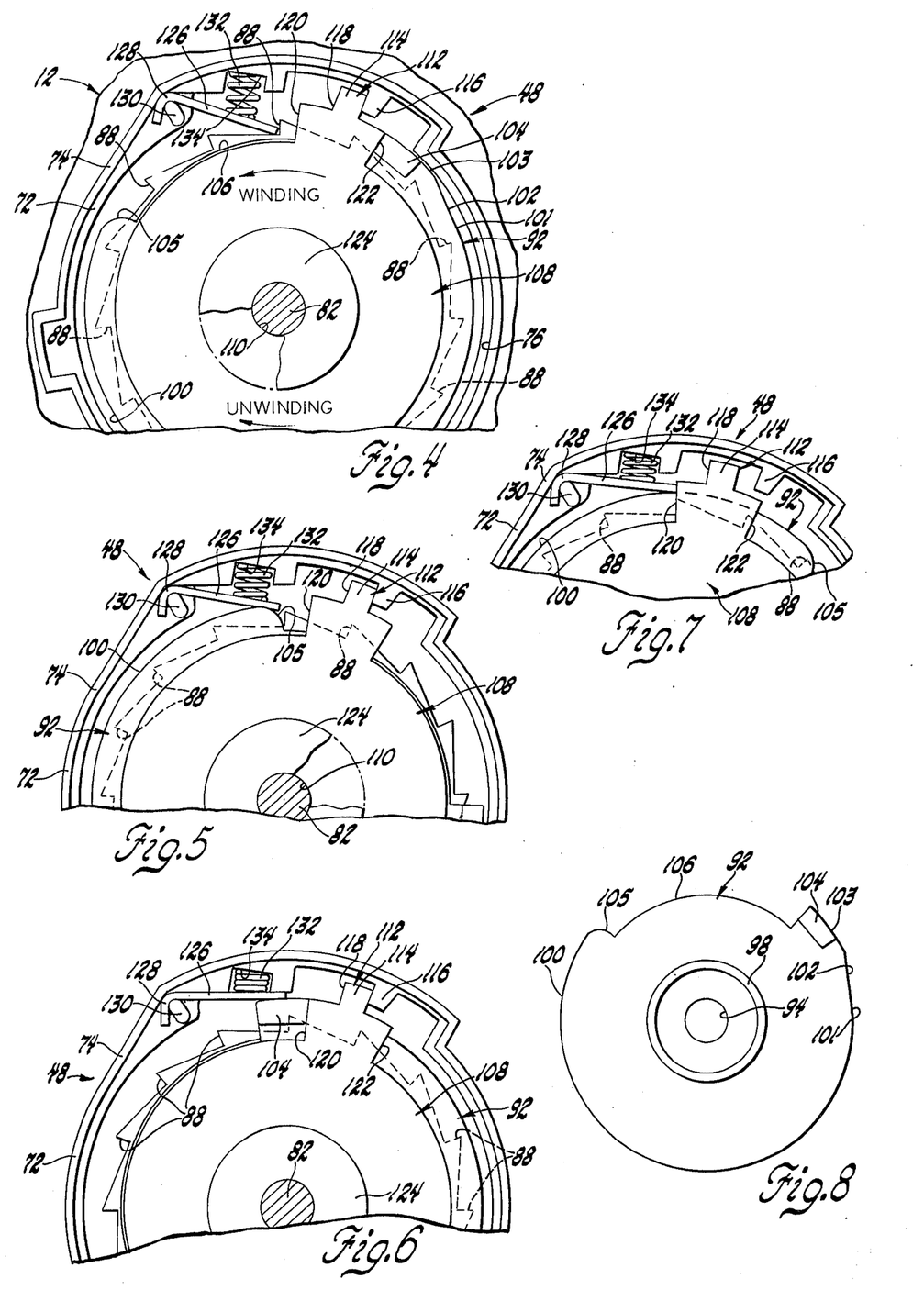
FIG. 4 is a view similar to FIG. 3 showing the belt in an extended position and the pawl in detenting position to prevent belt winding reel rotation and maintain the slack in the belt set by the occupant.
FIG. 5 is a view similar to FIG. 4 but with the belt slightly unwound from the FIG. 4 position as the occupant moves within limits from the initial position.
FIG. 6 is a view similar to FIG. 5 but with the belt in a further unwound condition from the FIG. 5 to thereby cancel the winding prevention feature and allow winding of the belt to a fully wound condition.
FIG. 7 is a view similar to FIG. 5 which shows the control surface of the control disc holding the pawl out of engagement with the ratchet teeth on the reel as the belt is wound back onto the reel.
FIG. 8 is a view of the control disc.

A control disc of the winding prevention mechanism is best seen in FIGS. 2 and 8 and is generally indicated by 92. This control disc has a central aperature 94 that rotatably receives the reduced diameter end portion 82 of the reel shaft 38 as can be seen in FIG. 2. A peripheral annular rib 96 of this control disc is frictionally engaged with the friction surface 90 on the ratchet plate 86. FIG. 8 shows the configuration of control disc 92 when viewed in an axial direction with respect to the reel shaft 38. An annular rib 98 on the opposite side of the control disc from its peripheral annular rib 96 has a smaller diameter than the rib 96 but is concentric with it as well as the aperture 96 that receives the reel shaft. A control surface 100 of the control disc 92 extends circumferentially on the outer peripheral ede of the disc for slightly less than 270°. One end of the control surface 100 has a radially raised cam surface 102 including a lifting portion 101 and a dwell portion 103. A projection 104 projects axially from the control disc 92 toward the cover 78 of the winding prevention mechanism as viewed in FIG. 2. The other end 105 of control surface 100 is rounded, as seen in FIG. 8, and coopertes with the projection 104 in defining a notch 106 which extends circumferentially over approximately 90° of the peripheral edge of the disc and has a smaller radius than the rest of the control disc 92. As seen in FIG. 3, the control surface 100 of the control disc 92 is located radially outwardly of the ratchet teeth 88 on ratchet plate 86, but the notch 106 exposes several of the ratchet teeth 88 due to its smaller radius. The dwell portion 103 of cam surface 102 is located further radially outward of the control surface 100 and is connected to the control surface 100 by the lifting portion 101.

As best seen in FIG. 8, the control surface 100 of the control disc 92 extends circumferentially on the outer peripheral edge of the disc for slightly less than 270°. The notch 106 has a circumferential extent of approximately 90°. The relative circumferential extent of the notch 106 and the control surface 100 may be varied by changing the location of the end 105 of the control surface 100. Furthermore, the circumferential extent of the control surface 100 may be controlled by modifying the extent of the lifting portion 101 and the dwell portion 103 of cam surface 102. Thus, the circumferential extent of the notch 106 and control surface 100 may be varied for purposes which will be discussed hereinafter.

As seen by reference to FIGS. 2 an 3, the winding prevention mechanism 48 also includes a blocking disc 108 having a central aperature 110 that rotatably receives the reduced diameter end portion 82 of the reel shaft 38. This aperture 110 permits the blocking disc 108 to rotate with respect to the shaft 38. As seen in FIG. 3, the blocking disc 108 has a diameter less than the ratchet plate 86 except for an outwardly projecting blocking portion indicated generally by 112. The blocking portion 112 indicates a radially outwardly projecting tip 114 that engages a stop 116 on the housing wall 74 to limit the rotation of the blocking disc 108 in the belt unwinding direction of rotation, clockwise as viewed in FIGS. 1 and 3. The tip 114 of the blocking portion also defines a notch 118 that faces in the counterclockwise belt winding direction. An intermediate stop surface 120 on the blocking portion 112 also faces in the counterclockwise belt winding direction of reel rotation. Another intermediate stop surface 112 on the blocking portion faces in the clockwise belt unwinding direction of reel rotation. The axial projection 104, of the control disc 92 engages the stop surface 122 on the blocking disc 108 to limit the rotation of the control disc 92 in the belt winding counterclockwise direction. Conversely, the stop surface 120 on the other side of the blocking portion 112 is likewise engaged by the projection 104 on the control disc 92 to limit the rotation of the control disc in the clockwise belt unwinding direction of reel rotation.

An annular washer-type spring 124 is received on the reduced diameter end portion 82 of the reel shaft 38 and engages the cover 78 of the winding prevention mechanism 48 as well as the blocking disc 108. Spring 124 biases the blocking disc 108 to the right as viewed in FIG. 2 so as to frictionally clutch the blocking disc 108 to the control disc 92 with this frictional engagement being located at the annular rib 98 of the control disc and the annular portion of the blocking disc which it engages. The spring 124 via the blocking disc 108 also frictionally engages the annular rib 96 of the control disc 92 with the friction surface 90 on the ratchet plate 86 to clutch the control disc to the periphery of the ratchet plate 86 just adjacent its ratchet teeth. Except when restrained by the limits of its rotation, the control disc 92 thus always rotates with the belt reel 26 due to its frictional clutching to the ratchet plate 86. Likewise, the blocking disc 108 always rotates with the control disc 92 except when restrained by the limits of its rotation.

A pawl 126 of the winding prevention mechanism 48 is best seen in FIG. 3. A hook-shaped end portion 128 of the pawl extends about a projection 130 on the mechanism housing 72 so that the pawl 126 is pivotally mounted for movement between a detenting position shown in FIG. 4 and first and second undetenting positions as in FIGS. 6 and 7. A spring 132 has one end seated in a recess 134 of the mechanism housing 72 and has its other end engaging the pawl 126 to bias the pawl toward the detenting position where the pawl 126 is engageable with one of the ratchet teeth 88 on the ratchet plate 86 to prevent belt winding reel rotation. Thus, the pawl 126 and ratchet plate 86 cooperate to provide a one-way ratchet mechanism which permits belt unwinding reel rotation but prevents belt winding reel rotation.

It will be understood that the term belt winding reel rotation used herein refers to rotation of the reel in the direction to wind the belt 28 on the belt reel 26. Belt winding reel rotation causes retraction of the belt. Conversely, the term belt unwinding reel rotation used herein refers to rotation of the reel in the clockwise direction causing the belt to be unwound and extended from the retractor.

OPERATION

The manner in which the control disc 92 and the blocking disc 108 cooperate with each other to control the detenting and undetenting positions of pawl 126 will now be described by first referring to FIG. 3 in which the belt is fully wound on the reel. As the belt 28 is initially unwound from the fully stored condition on the reel 26, the control disc 92 and the blocking disc 108 are frictionally driven in the clockwise unwinding direction to the position of FIG. 4 in which the pawl 126 is released from notch 118 and moves into engagement with one of the teeth 88 of the ratchet plate 86 that are exposed by the notch 106 in the control disc 92. The tip 114 of blocking portion 112 engages the stop 116 on the housing 74 to terminate the rotation of the blocking disc 108, but the control disc 92 continues to rotate with the reel 26 due to its frictional clutching engagement with the ratchet plate 86. As the ratchet plate 86 rotates, the pawl 126 ratchets progressively over the several ratchet teeth exposed by the control disc notch 106. The control disc 92 continues to rotate so that the clockwise rounded end 105 of its control surface 100 moves toward and into engagement with the pawl 126 as shown in FIG. 5 to lift the pawl 126 to its first undetented position. The control disc 92 then continues to rotate as the belt unwinding proceeds and the control surface 100 moves past the pawl 126 and the cam surface 102 then engages the pawl 126 to move the pawl further outwardly to the further or second undetenting position of FIG. 6. This outward movement of the pawl 126 positions the pawl in radial alignment with the notch 118 on the blocking portion 112 as seen in FIG. 6. Prior to this outward movement, the pawl is not radially aligned with this notch 118 but rather is radially aligned with the stop surface 120 on the blocking portion 112. Rotation of the control disc 92 beyond the position of FIG. 6 is stopped by engagement of the projection 104 with the stop surface 120 of the blocking portion 112. The above motion of the winding prevention mechanism all occurs within the first few inches of unwinding of the belt 28 and is effective to condition the pawl 126 for capture by notch 118 of the blocking disc 108 as will be discussed hereinafter. Further unwinding of the reel continues as the control disc 92 and blocking disc 108 are stopped in their positions of FIG. 6.

Unwinding of the belt 28 is continued by the occupant until a sufficient length is withdrawn to permit buckling of the free end of the belt so that the belt may provide its restraining function about the chest of the occupant. At this point there is generaly several inches of slack in the belt and the spring 46 rotates the belt reel in its belt winding direction of rotation of retract the belt and take up the slack. This belt winding reel rotation causes both the control disc 92 and the blocking disc 108 to rotate in a counterclockwise belt winding direction from the position of FIG. 6 toward the position of FIG. 3 where the pawl 126 is received by the notch 118 in the blocking portion 112 of the blocking disc 108 and thereby retained in its further undetenting position. Engagement of the pawl 126 in the notch 118 prevents further counterclockwise movement of the blocking disc 108. The control disc 92 is allowed to continue rotating counterclockwise until the projection 104 engages the stop surface 122 of the blocking portion 112 of the blocking disc 108 as seen in FIG. 3 so that both discs remain stationary during any further belt winding as slack is taken from the belt.

Subsequent to the belt buckling and the accompanying belt winding reel rotation to take up slack as described in the preceding paragraph, the belt 28 is held snugly in taut relation against the occupant by the biasing action of the belt winding spring 46. The occupant may relieve the tension on the belt by leaning forward or pulling on the belt to unwind the belt somewhat. This unwinding of the belt causes the blocking disc 108 and the control disc 92 to rotate clockwise with each other to the position of FIG. 4. This clockwise rotation of the blocking disc 108 allows the pawl 126 to move downwardly under the bias of spring 132 into detenting engagement with the next adjacent ratchet tooth 88 on ratchet plate 86. This engagement prevents belt winding reel rotation under the bias of spring 46. Thus, when the occupant leans back against the seat, an amount of slack is present in the belt and the occupant is relieved of tension that would be exerted across the chest via the belt 28. The occupant may further unwind the belt 28 from the FIG. 4 position and the pawl 126 will ratchet progressively over the teeth 88 exposed by notch 106 to introduce additional increments of slack into the belt. The control disc 92 rotates with the belt reel 46 during such further unwinding but the blocking disc 108 is restrained from proceeding in the clockwise belt unwinding direction of rotation due to the engagement of the stop 116 by the tip 114 of blocking portion 112. If the belt 28 is further unwound, the rounded clockwise end 105 of the control surface 100 on the control disc 92 is moved to the FIG. 5 position and engages the pawl 126 so as to move the pawl 126 upwardly to the first undetenting position out of engagement with the ratchet teeth 88 on the ratchet plate 86. Thus the effective circumferential extent of the notch 106 which exposes teeth 88, as determined by the relative locations of the rounded end 105 and the stop surface 120 of blocking disc 108, defines a first range of unwinding reel rotation during which the one-way ratchet mechanism provided by pawl 126 and ratchet plate 86 introduce progressive increments of slack into the belt 28.

Further unwinding of the belt 28 and consequent clockwise reel rotation from the FIG. 5 position causes the pawl 126 to ride along the control surface 100 so that the bias of spring 46 acts continuously on the belt 28. When the occupant leans back against the seat or releases his pull on the belt, the belt reel 46 will be rotated in its belt winding direction under the bias of the winding spring 46. During this winding reel rotation, blocking disc 108 assumes the position of FIG. 7 wherein stop surface 120 of the blocking disc 108 engages the pawl 126 to limit rotation of the blocking disc 108 in the winding direction. The winding proceeds until the control disc 92 rotates far enough so that the pawl 126 moves over the rounded end 105 of the control surface 100 as seen in FIG. 5 and into engagement with the first exposed ratchet tooth 88 on the ratchet plate 86 to again prevent the belt winding reel rotation and thereby relieve the tension on the belt and hold the belt at the maximum permissible condition of slackened relation about the occupant.

Thus the seat occupant can lean forward to reach the vehicle control or adjust his seating position and the belt will be unwound somewhat from the reel as the pawl 126 rides over the control surface 100. When the seat occupant leans back against the seat, the belt will be wound back up until the control disc returns to its original position wherein the control surface 100 lowers the pawl 126 back into engagement of the fixed exposed ratchet tooth 88.

If, however, the clockwise belt unwinding is sufficient to rotate the control disc 92 to the position of FIG. 6 and thereby cause the cam surface 102 of the control disc 92 to engage the pawl, the pawl 126 is lifed into alignment with the notch 118 on the blocking portion 112 as shown in FIG. 6. Subsequent winding rotation of the reel under bias of winding spring 46 as the occupant leans back against the seat or relieves the pull on the belt will cause the blocking disc 108 to be moved in the winding direction and be received and held in the notch 118. This cancels the memory of the winding prevention feature and the belt will be under the continuous tension of the winding spring 46 until the winding prevention feature is reactivated.

It will also be understood that the amount of slack which may be introduced into the belt is determined by the effective length of the notch 106. As best seen in FIG. 3, the effective length of the notch 106 is determined by the arcuate distance between the rounded end 105 of control surface 100 and the stop surface 120 of the blocking disc 108. This effective length of the notch 106 may be varied by changing the location of the rounded end 105 which begins the control surface 100. The effective length of the notch 106 is selected so as to provide an amount of belt slack not in excess of the amount of slackness which is known to provide effective restraint of the occupant in the event of a rapid vehicle deceleration which swings the pendulum 58 to lock the reel against unwinding rotation.

Referring again to the drawings, it will be seen that the circumferential spacing of the ratchet teeth 88 exposed by the notch 106 of control disc 92 will determine the number and the size of the increments of additional slack which may be provided in the belt by the one-way ratcheting action of the pawl 126 during unwinding reel rotation subsequent to actuation of the winding prevention mechanism. It will also be understood that the circumferential length of the control surface 100 between the cam surface 102 and the rounded end 105 will determine the range of unwinding which is permitted after actuation of the winding prevention mechanism without cancelling the memory of the winding prevention mechanism.

SUMMARY OF THE OPERATION

In summary, the operation of belt 10 proceeds from a fully wound belt condition as a vehicle occupant extends the belt 28 for use. After buckling of the end of the belt so that the belt is in restraining position about the occupants, the retractor winds the belt to eliminate any slack and the belt is then taut across the occupant. A slight unwinding of the belt by pulling or leaning forward then actuates the winding prevention mechanism by engaging the pawl 126 with the ratchet plate 86 to thereby relieve the occupant of the belt tension. Belt unwinding within a first predetermined range defined by the effective length of the notch 106 results in one-way ratcheting action which introduces progressive additional increments of slack into the belt. Belt unwinding beyond the first range and within a second predetermined range defined by the length of control surface 100 will allow the belt to be rewound by the winding spring until the pawl again engages the ratchet plate as the belt is returned to within the first range. If the belt unwinding proceeds beyond the second range, the winding prevention mechanism is cancelled to provide continuous tension on the belt causing it to be pulled taut across the occupant and/or to be fully wound to the stored condition by the bias of the winding spring.

Thus the present invention features a winding prevention mechanism which not only defines a first range of belt unwinding real rotation during which winding reel rotation by the winding spring is blocked to thereby hold the belt in a set slackened relation about the chest of the occupant, but further defines a second range of permissible belt unwinding during which the set slackened length of the belt is remembered so that belt winding reel rotation of the bias of the winding spring is again blocked when the belt has been rewound to its set slackened length.

What is claimed is:

1. In combination, an automotive vehicle having an occupant seat, a restraint belt for restraining the occupant in the seat, a reel having the belt wound thereon, a winding spring urging reel winding rotation to retract the belt to a stored position on the reel and pull the belt taut against the occupant when the belt is engaged in restraining position about the occupant, a locking mechanism effective to prevent belt extension only in response to a sensed acceleration condition so that the occupant may extend the belt for engagement in restraining position about the occupant and further extend the belt to permit leaning movement of the occupant in the seat by pulling the belt from the real against the winding spring, a detent mechanism effective when actuated to block winding rotation of the reel by the winding spring to hold the belt extended at its then length against the urging of the winding spring, and control means responsive to reel rotation induced by belt pull and urging of the winding spring and effective to control actuation of the detent mechanism such that the detent mechanism is actuated to hold the belt extended at a set condition of slackness with respect to the occupant upon predetermined sequence of reel rotation, and further effective to define the limits of a range of permissible further belt extension beyond the set condition of slackness as the occupant leans forwardly and to deactuate the detent mechanism during belt extension within the defined limited range to permit belt retraction by the winding spring as the occupant returns from the forwardly leaning position and then reactuate the detent mechanism when the belt is retracted to the length providing the set condition of slackness, said control means including means to deactuate the detent mechanism in response to reel rotation corresponding to belt extension beyond the defined limited range of permissible further extension whereby the urging of the winding spring pulls the belt taut against the occupant when the occupant returns from the forwardly leaning position and retracts the belt to stored position when released from engagement in restraining position.

2. In combination, an automotive vehicle having an occupant seat, a restraint belt for restraining an occupant in the seat, a reel for storing the belt and having a winding spring urging belt winding reel rotation to retract the belt on the reel and tension the belt against the occupant, a locking mechanism effective to prevent belt extension only in response to a sensed acceleration condition so that the occupant may normally extend the belt for engagement in restraining position about the occupant and further extent the belt to permit forward leaning movement in the seat by unwinding the belt from the reel, a detent mechanism effective when actuated to prevent belt winding reel rotation by the winding spring and relieve the tension on the belt to hold the belt extended at a set condition of slackness with respect to the occupant, disc means rotatably mounted and having a surface cooperably associated with the detent mechanism to control actuation of the detent mechanism, means for limiting rotation of the disc means to less than one revolution between one limit at which rotation of the disc means in the unwinding direction is stopped and another limit at which rotation of the disc means in the winding direction is stopped, friction clutch means acting between the disc means and the reel to rotate the disc means with the reel in both directions and allows the disc means to stop at the limits, the cooperable association between the disc means and the detent mechanism being such that upon belt unwinding rotation from the another limit of winding rotation of the disc means the detent mechanism is actuated over a first range of angular positions of the disc means to relieve belt tension by preventing winding reel rotation, and said cooperable association being such that upon further belt unwinding rotation the detent mechanism is deactuated over a second range of angular positions of the disc means so as to permit subsequent limited winding rotation of the reel and rotation of the disc means to within the first range of angular positions so as to again actuate the detent mechanism and relieve the belt tension, and means for deactuating and preventing the detent mechanism from being controlled within the first or second range of angular positions of the disc means during belt winding reel rotation subsequent to unwinding rotation to the one limit of unwinding rotation whereby the winding spring urges belt winding reel rotation and the belt is tensioned.

3. In an automotive vehicle having an occupant seat, a restraint belt for restraining the occupant in the seat, a reel having the belt wound thereon, a winding spring urging reel winding rotation to retract the belt on the reel and pull the belt taut against the occupant, and a locking mechanism effective to prevent belt extension only in response to a sensed acceleration condition so that the occupant may normally lean forwardly in the seat by extending the belt from the reel, the improvement comprising a one-way ratchet mechanism connected with the reel having a deactuated condition permitting free winding and unwinding reel rotation and an actuated condition permitting one-way unwinding reel rotation but preventing winding reel rotation by the winding spring to thereby relieve the urging of the winding spring acting upon the belt, a control mechanism for selectively actuating and deactuating the one-way ratchet mechanism and including first and second discs mounted for rotation relative the reel, means interconnecting the discs with the reel and the housing so that the reel rotates the discs within predetermined limits of rotation relative the housing, the discs cooperating upon initiation of belt extension subsequent belt retraction to actuate the one-way ratchet mechanism to block winding roatation of the reel at the urging of winding spring so that the belt may be positioned in slackened relation about the occupant, the one-way ratchet mechanism functioning during further unwinding rotation to introduce additional increments of slack in the belt, one of the discs having means defining a first limit of rotation and operating the one-way ratchet mechanism to deactuated condition upon unwinding reel rotation beyond the first limit so as to restore the urging of the winding spring until winding reel rotation returns the reel and the one disc to the first limit and the one-way ratchet mechanism is again actuated to relieve the urging of the winding spring so that the belt is restored to slackened relation about the occupant, one of the discs having means defining a second limit of unwinding rotation, the discs being effective upon unwinding reel rotation beyond the second limit to deactuate the one-way ratchet mechanism and maintain the deactuated condition upon belt winding reel rotation to and beyond the first limit of rotation whereby the urging of the winding spring is restored to the reel to retract the belt.

4. In combination, an automotive vehicle having an occupant seat, a restraint belt for restraining the occupant in the seat, a reel having the wound thereon, a winding spring urging winding reel rotation to retract the belt on the reel and pull the belt taut against the occupant, a locking mechanism effective to prevent belt extension only in response to a sensed acceleration condition so that the occupant may normally lean forwardly in the seat by extending the belt from the reel, a ratchet wheel connected with the reel for rotation therewith and having ratchet teeth thereon, a pawl selectively engageable with the ratchet teeth to prevent belt winding reel rotation by the winding spring, a pair of disc members mounted for rotation with respect to the ratchet wheel and having peripheral surfaces characterized by radially extending portions effective to move the pawl into and out of engagement with the ratchet teeth upon disc member rotation and circumferentially extending portions allowing the pawl to dwell at the then attained position during disc member rotation, friction drive means interconnecting the disc members and the reel to rotate the disc members in response to reel rotation, the sequence of disc member rotatable by the friction drive means and the configuration of peripheral surfaces of the disc members being so arranged that in response to belt unwinding reel rotation as the occupant leans forwardly in the seat the pawl is engaged with the ratchet teeth to block belt retracting winding reel rotation but permit nonreversible progressive increments of belt slacking extension as the pawl ratchets over the ratchet teeth so as to introduce slack into the belt, at least one of the disc members having a radially extending portion which is effective to define the limit of such nonreversible increments of belt slackening extension by disengaging the pawl from the ratchet teeth, and a circumfrentially extending portion on at least one disc member allowing the pawl to dwell at the disengaged position until winding reel rotation by the winding spring retracts the belt and reversely rotates the at least one disc member so that the radially extending portion returns the pawl into engagement with the ratchet teeth whereby belt retracting winding reel rotation is blocked at the limit of belt slackening extension when the occupant returns from the forwardly leaning position.

5. In combination, an automotive vehicle having an occupant seat, a restraint belt for engagement in restraining position about the occupant to restrain in the seat, a reel having the belt wound thereon, a winding spring urging reel winding rotation to retract the belt on the reel and pull the belt taut against the occupant, a locking mechanism effective to prevent belt extension only in response to a sensed acceleration condition so that the belt may be extended for engagement in restraining position and the occupant may normally lean forwardly in the seat by extending the belt from the reel, a ratchet wheel connected with the real for rotation therewith, a pawl selectively engageable with the ratchet wheel to prevent belt winding reel rotation by the winding spring, a first disc and a second disc mounted for rotation relative the reel and effective to control engagement and disengagement of the pawl with the ratchet wheel, means interconnecting the discs with the reel and the housing so that the reel rotation rotates the discs within predetermined limits of rotation relative the housing, the interconnecting means conditioning the first and second discs for control of the pawl upon belt winding reel rotation subsequent to the engagement of the belt in restraining position about the occupant, the first disc defining a first limit of unwinding reel rotation up to the first limit to allow engagement of the pawl with the ratchet wheel to block winding rotation of the reel by the winding spring to hold the belt against the urging of the winding spring in a slackened condition about the occupant, the first disc defining a second limit of rotation beyond the first limit and coacting with the pawl during rotation between the first and second limits of rotation to disengage the pawl from the ratchet wheel to permit winding rotation of the reel by the winding spring and then coacting to engage the pawl with the ratchet wheel when winding reel rotation returns the reel and the first disc to the first limit of rotation to thereby reestablish the slackened condition of the belt about the occupant, the first and second discs being effective upon unwinding reel rotation beyond the second limit of rotation to condition the pawl for capture by the second disc so that the pawl is maintained in disengagement upon belt winding reel rotation even beyond the fist limit of rotation whereby the urging of the winding spring is restored to pull the belt taut against the occpant and retract the belt on the reel when disengaged from restraining position.

6. In a vehicle occupant restraint belt retractor having a belt reel rotatably supported on a housing, a belt wound and unwound from the reel during rotation in opposite directions, a locking mechanism for selectively locking the belt reel against belt unwinding reel rotation and a winding spring biasing the reel in the belt winding reel rotation direction, a winding prevention mechanism from selectively preventing belt winding reel rotation comprising:

a ratchet plate drivingly connected to the reel for rotation therewith and having ratchet teeth facing in the belt winding direction of rotation;

a pawl mounted on the housing for movement between a detenting position engaging one of the ratchet teeth to prevent belt winding reel rotation by the winding spring, a first undetenting position allowing normal biasing of the reel by the winding spring, and a second undetenting position;

a control disc having a peripheral edge engageable with the pawl for moving the pawl between detenting and undetenting positions, the control disc having a notch in the peripheral edge allowing movement of the pawl to detenting position engaging one of the ratchet teeth and a cam surface speed circumferentially from the notch and engageable with the pawl to the second undetenting position;

means rotating the control disc with the reel in response to belt unwinding reel rotation, means stopping control disc rotation when the cam surface of the control disc engages and moves the pawl to the second undetenting position;

means rotating the control disc with the reel in response to belt winding reel rotation, means stopping the control disc when the notch is aligned with the pawl;

blocking means operative to capture and hold the pawl in the second undenting position during belt winding reel rotation subsequent to belt unwinding reel rotation which causes the cam surfaces to move the pawl to second undetenting position, said blocking means releasing the pawl member from the second undetenting position upon subsequent belt unwinding reel rotation;

the control disc having a control surface extending between the notch and the cam surface in the belt winding reel rotation direction from the notch, the control surface holding the pawl in the first undetenting position during belt winding reel rotation subsequent to belt unwinding reel rotation insufficient to cause the cam surface to move the pawl to the second undetenting position thereby allowing rotation of the reel in the belt winding reel rotation direction until the notch is again aligned with the pawl to engage the pawl with the ratchet teeth and prevent rotation of the reel in the belt winding reel rotation direction by the winding spring.

7. In a vehicle occupant resistant belt retractor having a belt reel rotatably supported on a housing, a belt wound and unwound by the reel during rotation in opposite directions, a locking mechanism for selectively locking the belt reel against belt unwinding reel rotation, and a winding spring for biasing the reel in the belt winding direction of rotation, a winding prevention mechanism for selectively preventing winding rotation of the reel and comprising:

a ratchet plate drivingly connected to the reel for rotation therewith and having ratchet teeth facing in the belt winding direction of rotation;

a pawl mounted on the housing for movement between a detenting position engaging one of the ratchet teeth to prevent belt winding reel rotation by the winding spring, a first undetenting position allowing belt winding reel rotation by the winding spring, and a second undetenting position;

a control disc engageable with the pawl for moving the pawl between the detenting and undetenting positions, the control disc having progressively displayed on the peripheral edge thereof in the belt winding direction a notch, a control surface, and a cam surface;

means frictionally clutching the control disc with the reel in both directions to rotate the control disc with the reel in the belt unwinding direction to progressively move the pawl during belt unwinding rotation from the detenting position to the first undetenting position by engaging the control surface with the pawl and to the second undetenting position by engaging the cam surface with the pawl;

means for limiting rotation of the control disc to less than one revolution between one limit aligning the notch with the pawl to another limit engaging the cam surface with the pawl; and blocking means operative to capture and hold the pawl in the second undetenting position during belt winding reel rotation subsequent to belt unwinding rotation which causes the cam surface to move the pawl to second undenting position, said blocking means releasing the pawl member from the second undetenting position upon subsequent belt unwinding reel rotation, the control surface holding the pawl in the first undetenting position during belt winding reel rotation subsequent to belt unwinding reel rotation insufficient to cause the cam surface to move the pawl to second undetenting position thereby allowing return of the reel in the belt winding direction until the notch is again aligned with the pawl to engage the ratchet teeth and prevent wind up by the winding spring.

8. In a vehicle occupant restraint belt retractor having a belt reel rotatably supported on a housing, a belt wound and unwound by the reel during rotation in opposite directions, a locking mechanism for selectively locking the belt reel against belt unwinding reel rotation, and a winding spring for biasing the reel in the belt winding direction of rotation, a winding prevention mechanism for selectively preventing winding rotation of the reel and comprising:

a ratchet plate drivingly connected to the reel for rotation therewith and having ratchet teeth facing in the belt winding direction of rotation;

a pawl movably mounted on the housing and having a detenting position engaging one of the ratchet teeth to prevent belt winding reel rotation by the winding spring, a control disc frictionally clutched to the reel for rotation therewith and having a control surface engageable with the pawl for controlling movement of the pawl between the detenting position and a first undetenting position and a cam surface controlling movement of the pawl between the first undetenting position and a second undetenting position;

means for limiting rotation of the control disc to less than one revolution between one limit with the pawl in detenting position and another limit with the pawl in second undetenting position;

a blocking disc frictionally clutched to the reel for rotation therewith and having a surface for engaging and holding the pawl in the second undetenting position;

said blocking disc and control disc cooperatively whereby upon substantial belt unwinding reel rotation of the belt reel to withdraw the belt for buckling about the occupant the cam surface of the control disc moves the pawl to the second undetenting position out of engagement with the ratchet teeth;

upon subsequent winding reel rotation of the belt reel by the winding spring the blocking disc acts to capture and hold the pawl in the second undetenting position;

upon subsequent belt unwinding reel rotation the blocking disc acting to release the pawl for movement to the detenting position and thereby prevent the winding effort of the winding spring from acting on the belt;

upon further belt unwinding reel rotation of the pawl being engaged by the control surface of the control disc to move the pawl to the first undetenting position preventing clicking of the pawl over the ratchet teeth and permitting subsequent belt winding reel rotation to rotate the control disc in the winding direction and disengage the control surface from the pawl to return the pawl to detenting position;

upon belt unwinding reel rotation beyond the extent of the control surface the cam surface engaging and moving the pawl to the second undetenting position; and upon subsequent belt winding rotation the pawl is held in the second undetenting position permitting belt winding reel rotation by the winding spring to complete winding of the belt on the reel.

9. In an automotive vehicle having an occupant seat, a restraint belt for restraining an occupant in the seat, a reel for storing the belt and having a winding spring urging belt winding reel rotation to retract the belt on the reel and tension the belt against the occupant, a locking mechanism effective to prevent belt extension only in response to a sensed acceleration condition so that the occupant may freely extend the belt for engagement in restraining position about the occupant and further extend the belt to permit forward leaning movement of the occupant in the seat by pulling the belt from the reel against the bias of the winding spring, the improvement comprising; a detent mechanism actuatable to block belt winding rotation of the reel by the winding spring to hold the belt extended at its then length against the urging of the winding spring; and control means responsive to reel rotation induced by belt pull and the urging of the winding spring and effective to control actuation of the detent mechanism such that the detent mechanism remains unactuated during belt unwinding reel rotation induced by belt pull to extend the belt for engagement in restraining position about the occupant and remains unactuated during subsequent belt winding reel rotation by the winding spring to pull the belt taut against the occupant, said control means being effective upon subsequent belt unwinding reel rotation to actuate the detent mechanism to block belt winding and establish slack in the belt and define a first range of belt unwinding reel rotation during which the detent mechanism is actuated to provide progressive nonreversible increments of additional slack in the belt upon additional increments of belt unwinding by the occupant, said control means having a control surface for controlling actuation of the detent mechanism upon unwinding movement beyond the limit of the first range of belt unwinding and defining a second range of belt unwinding reel rotation during which the detent mechanism is temporarily unactuated so as to restore the urging of the winding spring to provide belt winding rotation of the reel to return the control means to within the first range so that the detent mechanism is again actuated to block belt winding and reestablish slack in the belt, and said control means having a further control surface for controlling actuation of the detent mechanism upon unwinding movement beyond the limit of the second range and effective upon unwinding reel rotation beyond the second range of unwinding defined by the control means to maintain the detent mechanism in an unactuated condition so that the winding spring urges winding of the belt to pull the belt taut against the occupant and wind the belt to the stored condition when released from engagement in the restraining position.

10. In an automotive vehicle having an occupant seat, a restraint belt for restraining an occupant in the seat, a reel for storing the belt and having a winding spring urging belt winding reel rotation to retract the belt on the reel and tension the belt against the occupant, a locking mechanism effective to prevent belt extension only in response to a sensed acceleration condition so that the occupant may freely extend the belt for engagement in restraining position about the occupant and further extend the belt to permit forward leaning movement of the occupant in the seat by pulling the belt from the reel against the bias of the winding spring, the improvement comprising; a plurality of circumferentially spaced ratchet teeth carried by the reel for rotation therewith and facing in the belt winding direction of rotation, a pawl selectively engageable with one of the ratchet teeth to prevent belt winding reel rotation by the winding spring; and control means carried by the reel for rotation therewith in the belt winding direction induced by the winding spring and in the belt unwinding direction induced by pull on the belt, said control means being effective to provide an initial state of disengagement of the pawl and prevent engagement of the pawl with the ratchet teeth during a plurality of revolutions of the reel in the unwinding direction as the belt is extended for engagement in restraining position about the occupant and during subsequent rotation of the reel in the winding direction induced by the winding spring to pull the belt taut against the occupant, said control means having a control surface for controlling selective engagement of the pawl with one of the ratchet teeth upon belt unwinding rotation subsequent to belt winding rotation to prevent belt winding reel rotation by the winding spring but permit further belt unwinding by ratcheting of the pawl over the ratchet teeth so that the belt may be unwound to introduce additional nonreversible increments of slack into the belt, said control means having a memory control surface engaging the pawl upon unwinding rotation beyond a predetermined limit and defining a range of belt unwinding reel rotation during which the control surface holds the pawl out of engagement with the ratchet teeth so that the urging of the winding spring is restored to provide winding rotation of the reel and control means to within the predetermined limit so that the control surface again controls engagement of the pawl with the of the ratchet teeth, and said control means having another control surface effective to return the pawl to the initial state of disengagement upon unwinding reel rotation beyond the range of rotation defined by the memory control surface so that the winding spring urges winding of the belt taut against the occupant and stores the belt on the reel when the belt is disengaged from the restraining position.

* * * * *

UNITED STATES PATENT AND TRADEMARK OFFICE
CERTIFICATE OF CORRECTION

PATENT NO. : 4,023,746

DATED : May 17, 1977

INVENTOR(S) : Joseph J. Magyar

It is certified that error appears in the above-identified patent and that said Letters Patent are hereby corrected as shown below:

Column 1, line 25, "retactor" should be -- retractor --.
Column 6, line 4, "96" should be -- 94;
Column 6, line 6, "ede" should be -- edge --;
Column 6, lines 13 and 14, "coopertes" should be -- cooperates --;
Column 6, line 40, "an" should be -- and --;
Column 6, line 58, "112" should be -- 122 --.
Column 8, line 30, second occurrence of "of" should be -- to --.
Column 9, line 40, "control" should be -- controls --;
Column 9, line 46, "fixed" should be -- first --.
Column 10, line 29, "occupants" should be -- occupant --;
Column 10, line 52, "real" should be -- reel --;
Column 10, line 58, "of" should be -- by --.
Column 11, Claim 1, line 6, "real" should be -- reel --;
Column 11, Claim 2, line 44, "extent" should be -- extend --;
Column 11, Claim 2, line 60, "allows" should be -- allow --.
Column 12, Claim 3, line 37, insert -- to substantial -- after "subsequent";
Column 12, Claim 4, line 62, insert -- belt -- after second occurrence of "the".

UNITED STATES PATENT AND TRADEMARK OFFICE
CERTIFICATE OF CORRECTION

PATENT NO. : 4,023,746

DATED : May 17, 1977

INVENTOR(S) : Joseph J. Magyar

It is certified that error appears in the above-identified patent and that said Letters Patent are hereby corrected as shown below:

Column 13, Claim 4, line 28, insert -- the -- after "on";
Column 13, Claim 4, line 15, "rotatable" should be -- rotation --;
Column 13, Claim 5, line 39, insert -- the occupant -- after "restrain";
Column 13, Claim 5, line 48, "real" should be -- reel --;
Column 13, Claim 5, line 62, insert -- and being effective during unwinding reel rotation -- after "rotation".
Column 14, Claim 5, line 14, "occpant" should be -- occupant --;
Column 14, Claim 6, line 24, "from" should be -- for --;
Column 14, Claim 6, line 41, "speed" should be -- spaced --;
Column 14, Claim 6, line 42, insert -- to move the pawl -- after "pawl".
Column 15, Claim 7, line 6, "resistant" should be -- restraint --.
Column 16, Claim 8, line 24, "cooperatively" should be -- cooperating --.

Signed and Sealed this

Second Day of May 1978

[SEAL]

Attest:

RUTH C. MASON
Attesting Officer

LUTRELLE F. PARKER
Acting Commissioner of Patents and Trademarks